(12) United States Patent
Nguyen et al.

(10) Patent No.: US 6,334,633 B1
(45) Date of Patent: Jan. 1, 2002

(54) AUTOMATIC LOCK FOR TELESCOPING JOINT OF A RISER SYSTEM

(75) Inventors: Lan T. Nguyen, League City; Scott D. Ward; Roger Boisjolie, both of Houston, all of TX (US)

(73) Assignee: Cooper Cameron Corporation, Houston, TX (US)

( * ) Notice: Subject to any disclaimer, the term of this patent is extended or adjusted under 35 U.S.C. 154(b) by 0 days.

(21) Appl. No.: 09/193,884

(22) Filed: Nov. 18, 1998

(51) Int. Cl.$^7$ ..................................................... F16L 21/08
(52) U.S. Cl. ......................... 285/320; 285/920; 285/322; 285/18
(58) Field of Search ............................ 285/18, 920, 319, 285/320, 322

(56) References Cited

U.S. PATENT DOCUMENTS

| | | | |
|---|---|---|---|
| 2,726,848 A | * | 12/1955 | Montgomery et al. .. 285/320 X |
| 2,887,124 A | * | 5/1959 | Mehl ........................ 285/320 X |
| 3,052,299 A | * | 9/1962 | Geer et al. |
| 3,077,330 A | * | 2/1963 | Lamphear ................. 285/320 X |
| 3,098,525 A | * | 7/1963 | Haeber |
| 3,099,317 A | * | 7/1963 | Todd |
| 3,128,009 A | * | 4/1964 | Norton |
| 3,510,153 A | * | 5/1970 | Newton |
| 3,972,546 A | | 8/1976 | Putch |
| 4,076,284 A | | 2/1978 | Herbert et al. |
| 4,134,452 A | | 1/1979 | Kingelin |
| 4,348,039 A | | 9/1982 | Miller |
| 4,372,584 A | | 2/1983 | Miller |
| 4,632,432 A | | 12/1986 | Reneau |
| 4,732,214 A | * | 3/1988 | Yates |
| 4,854,777 A | | 8/1989 | Lemoine et al. |
| 5,163,783 A | | 11/1992 | Fahrmeier et al. |
| 5,462,121 A | | 10/1995 | Schmuck et al. |
| 5,692,564 A | | 12/1997 | Brooks |
| 5,697,652 A | * | 12/1997 | Nishikawa ..................... 285/314 |
| 5,718,291 A | | 2/1998 | Lorgen et al. |

OTHER PUBLICATIONS

Cooper Cameron Corporation Brochure, Dual Packer Assembly, 1 page, Jun. 1996.
Cooper Cameron Corporation Brochure, Cameron HC Collet Connector, 1 page, Jun. 1996.

* cited by examiner

*Primary Examiner*—Teri Pham Luu
(74) *Attorney, Agent, or Firm*—Michael P. Hartmann; Peter A. Bielinski

(57) ABSTRACT

An automatic locking mechanism for a telescoping joint for a riser functions in several modes. In an operating mode, the joint is free to have its inner and outer barrels move with respect to each other without engaging each other in a locking relationship. In a second position, the telescoping joint locks when it is fully retracted. In a third position, the system locks the inner and outer barrels together to hold them in a fixed position. The inner and outer barrels are locked when a movable sleeve is properly positioned to allow spring-loaded dogs to be biased through windows in the sleeve so as to act as a landing shoulder to catch a groove on the outer barrel. By putting the actuating sleeve in a variety of positions, the various modes of the locking assembly can be deployed.

19 Claims, 9 Drawing Sheets

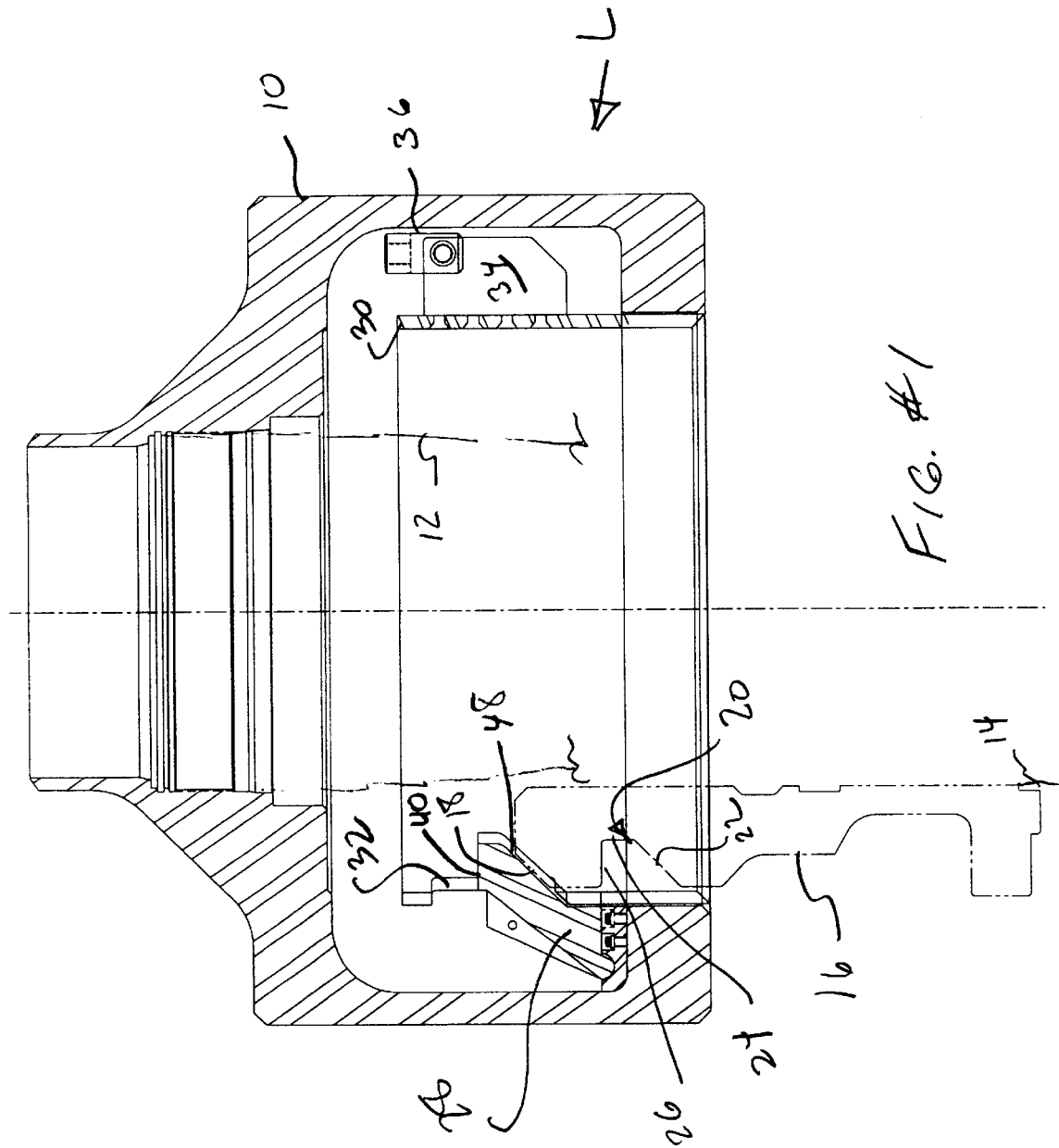
FIG. #1

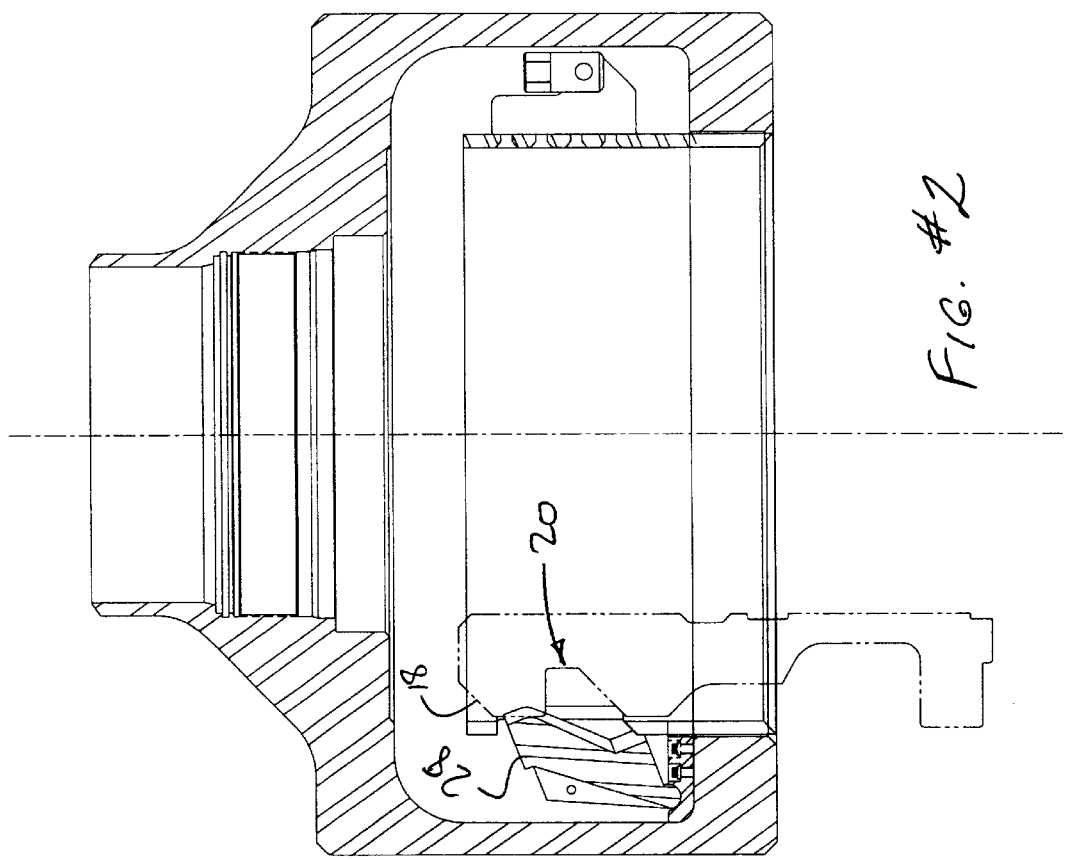

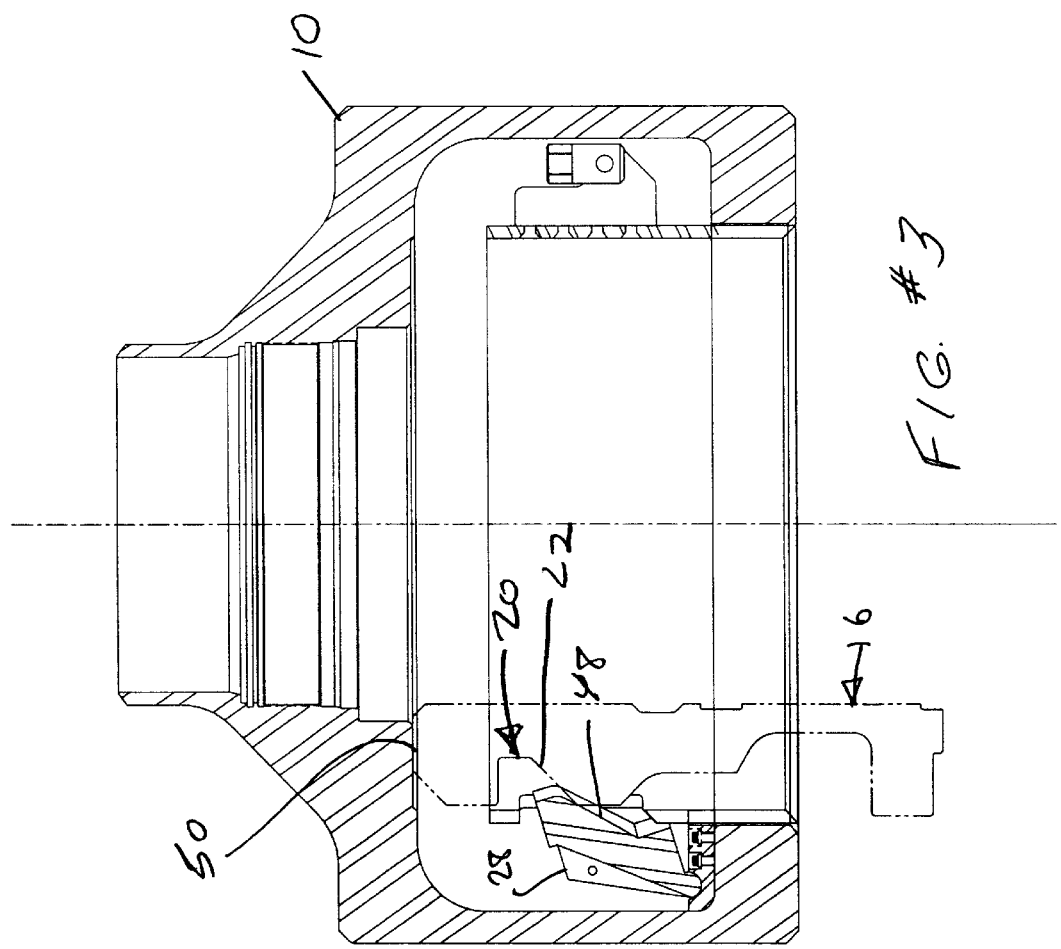

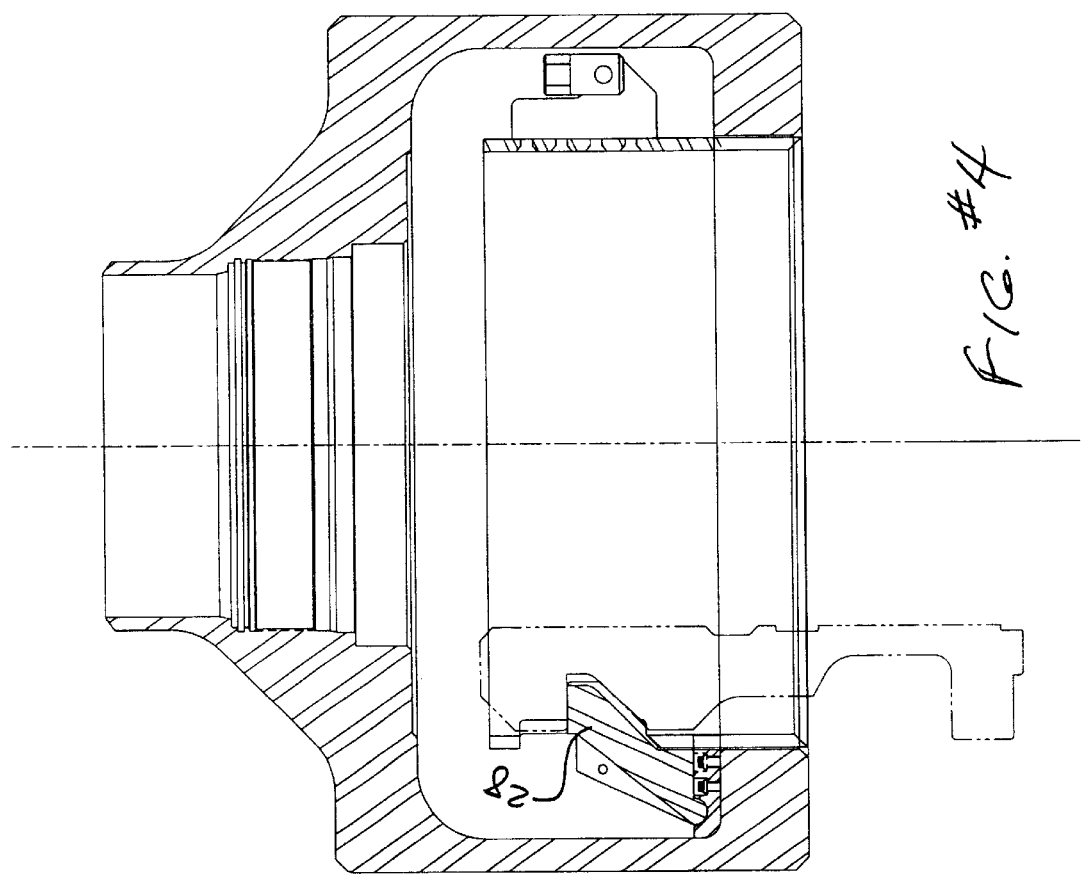

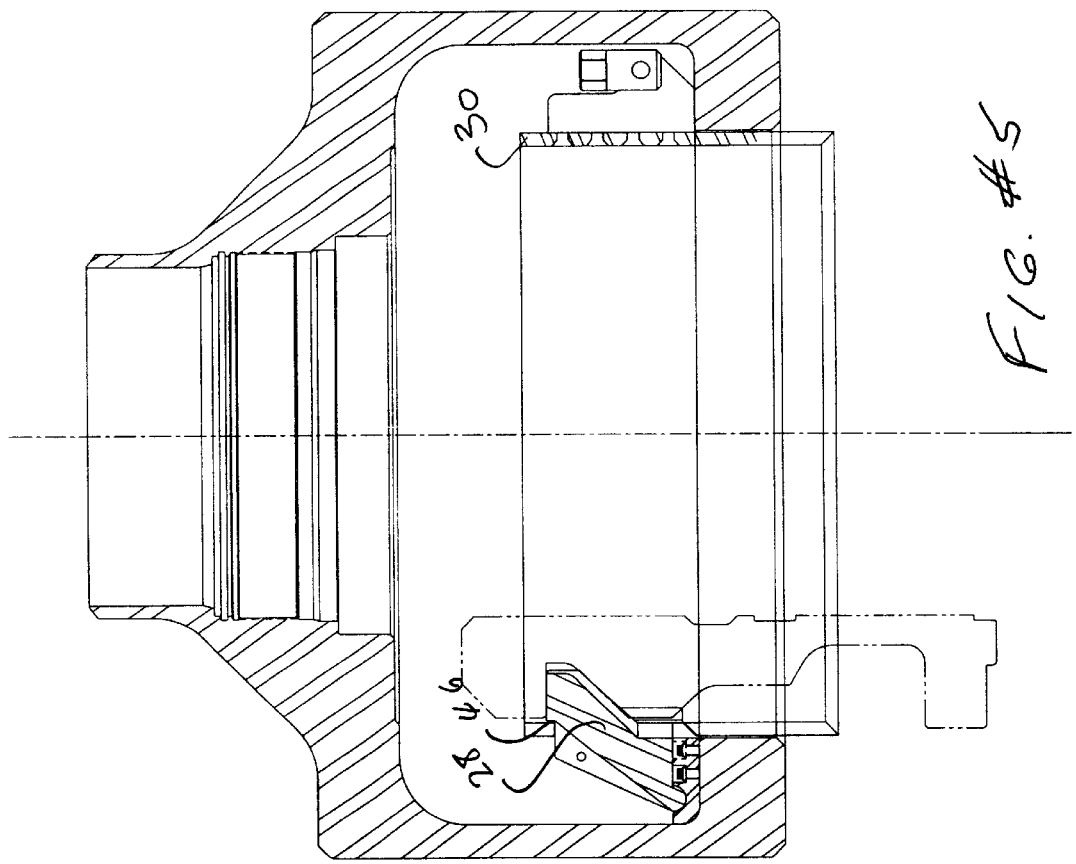

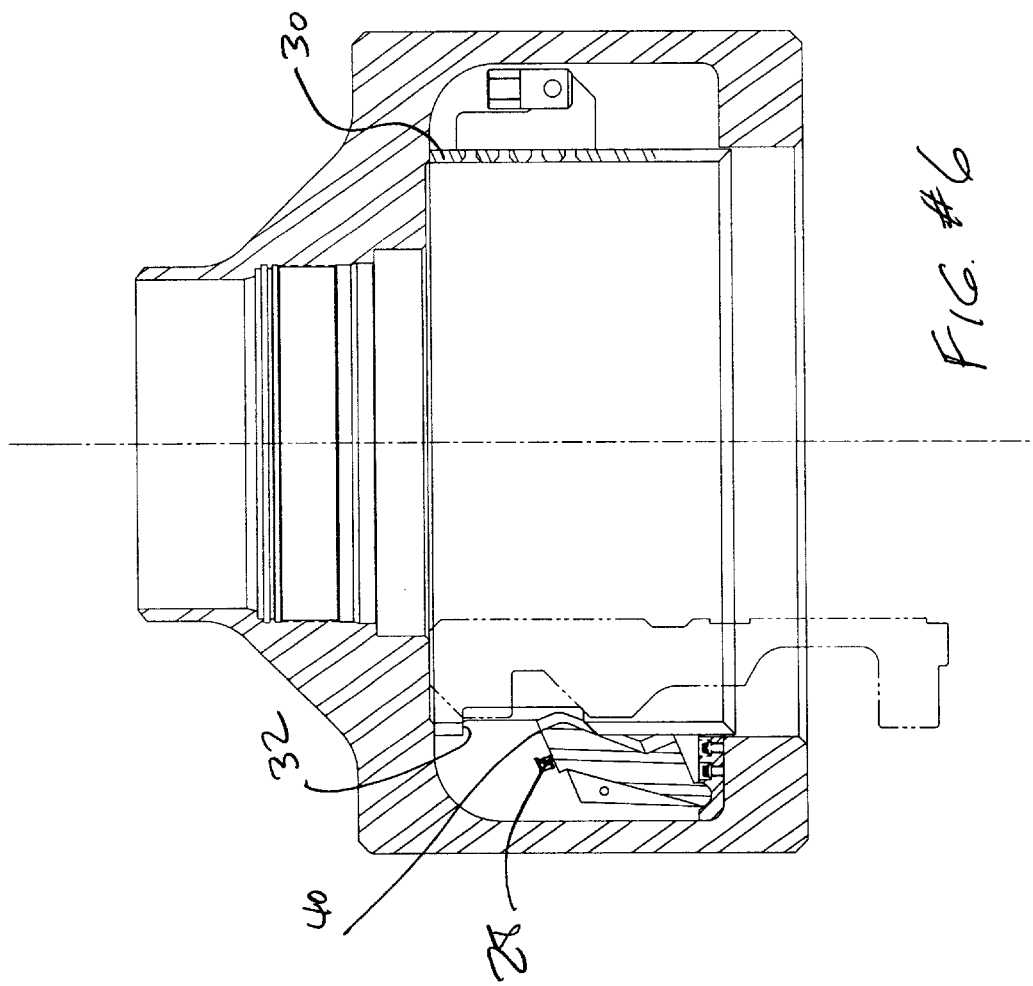

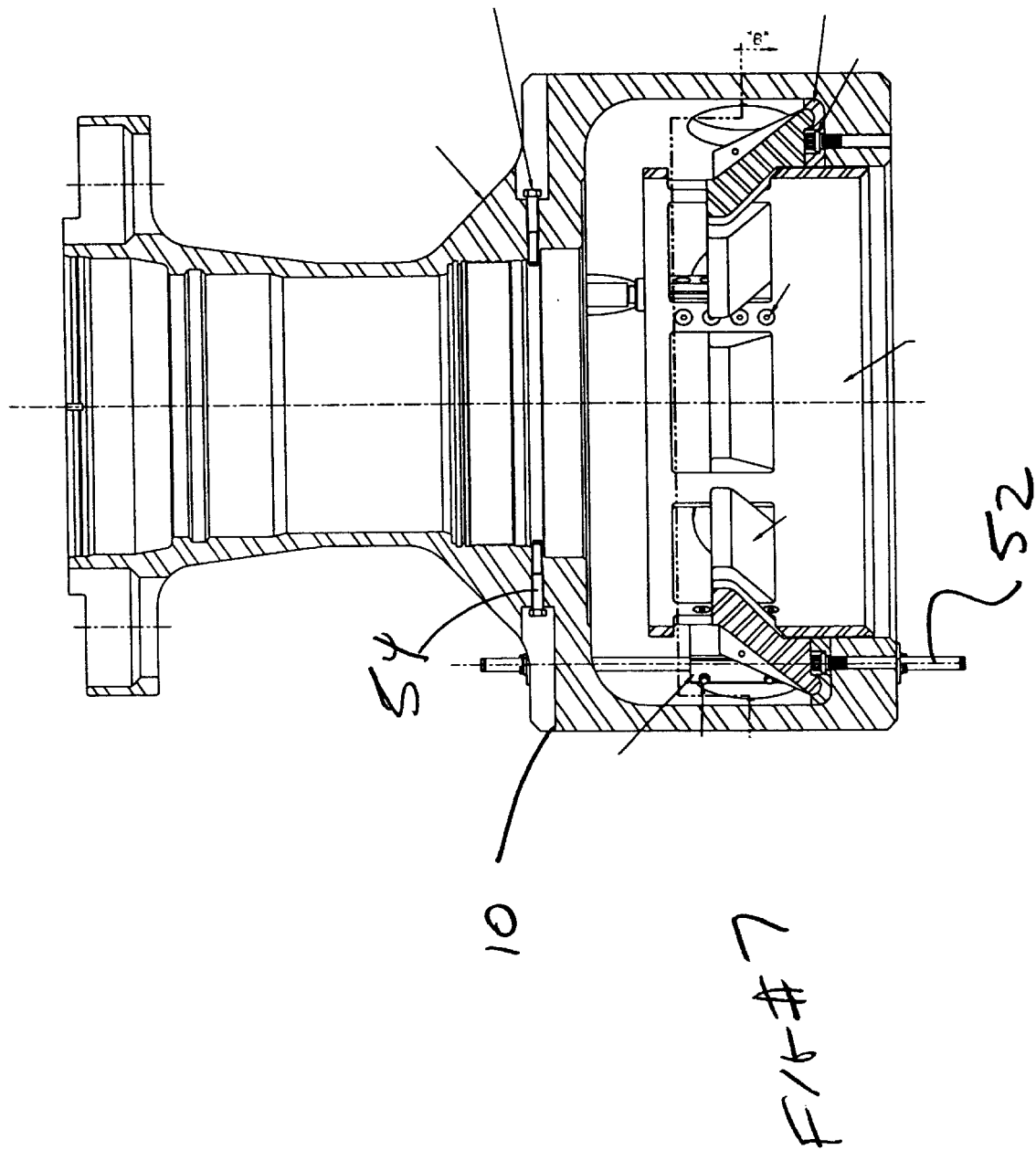

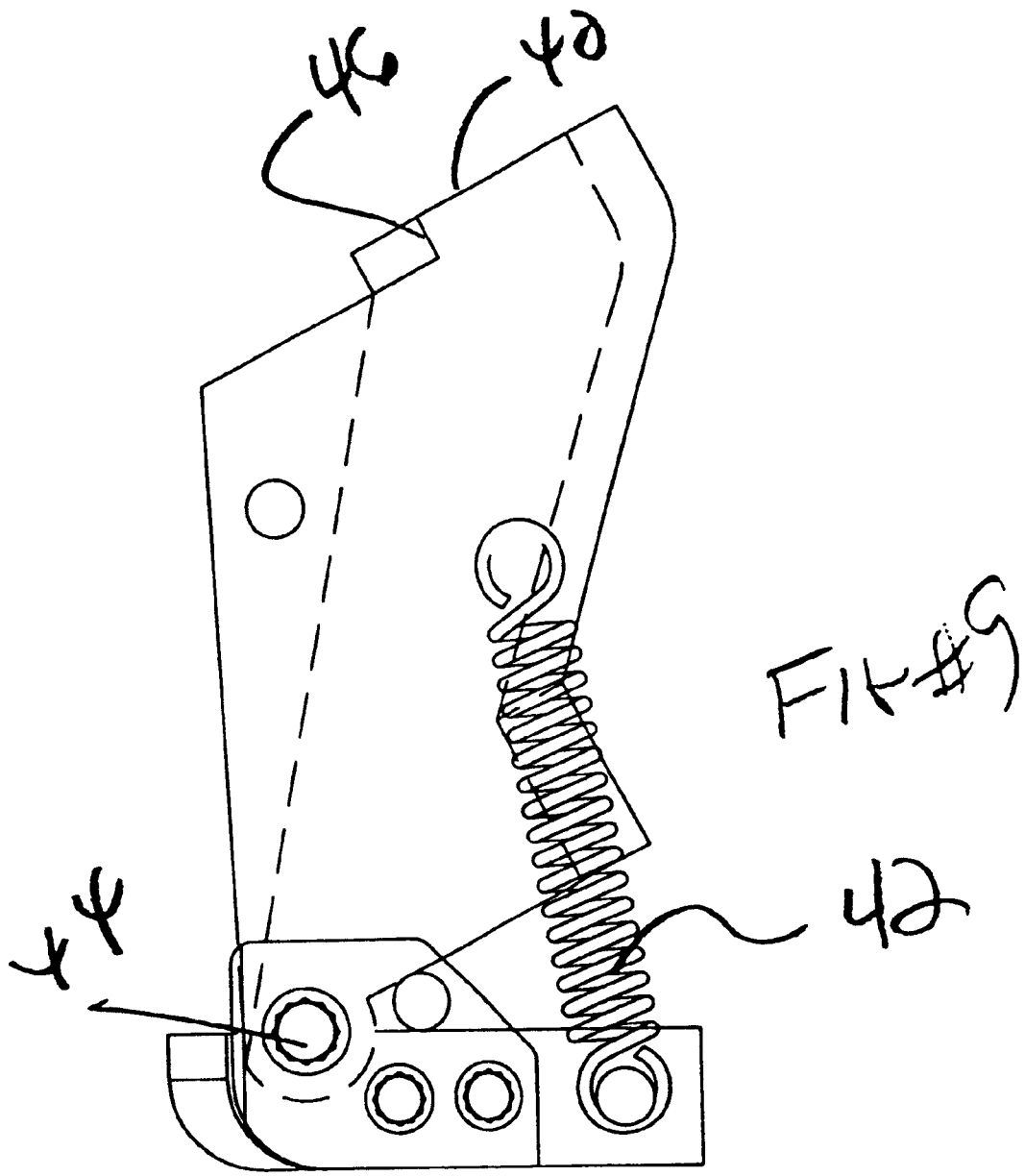

AUTOMATIC LOCK FOR TELESCOPING JOINT OF A RISER SYSTEM

FIELD OF THE INVENTION

The field of this invention relates to selective locking systems for telescoping joints in offshore riser systems.

BACKGROUND OF THE INVENTION

Riser systems are used in offshore systems to connect surface equipment to the BOP stack mounted subsea on the wellhead. The telescoping joint compensates for movement of the surface equipment due to wave action. Conditions arise when the telescoping joint needs to be in a locked position. One such situation can occur during times of bad weather when the riser is disconnected from the BOP stack and is freely suspended above the BOP stack. Other operating conditions may dictate that when the telescoping joint strokes to its retracted position that it be automatically locked. Other situations may arise where the telescoping joint needs to be locked in its retracted position where its overall length is the shortest. These situations occur when the joint is being transported or stored.

In the past, when it has been desirable to lock the telescoping joint of a riser system, a manual operation was required. Thus, bolts having eccentric lugs on one part of the joint would have to be turned with tools to orient the eccentrically mounted lug into a groove on another part of the joint so as to hold the telescoping joint in a retracted position. Dual packer assemblies made by Cooper Cameron Corporation included this feature. The problem with doing this was that the riser system is in a relatively inaccessible area known as the "moonpool" of the surface rig. Thus, operating personnel had to be hoisted to obtain access to the various bolts and try to rotate them while suspended adjacent to them in a sling. This procedure was difficult to accomplish and involved certain risks from a safety standpoint.

Different types of connections for other applications involving hydraulic assist for make-up have been used. Cooper Cameron makes an HC collet connector which employs hydraulic cylinders moving a sleeve to cam a grooved collet to catch a groove on the collet around mating flange connections of a joint to hold the joint together. Other connectors are illustrated in U.S. Pat. Nos. 4,348,039; 4,372,584; 4,632,432; 4,854,777; 5,163,783; 5,462,121; 5,692,564; 5,718,291.

What these connections lack is a simple design which can support extremely high loads and be adjusted easily for different modes of operation. The prior designs, specific to the application of telescoping joints for risers, involved manual operations which were time-consuming and presented risks to personnel. Thus, one of the objects of the present invention is to provide a simple system which can accommodate a variety of situations without the need of close access to the telescoping joint by personnel within the moon-pool. Another objective of the present invention is to provide a design which will accommodate the high loads required, while at the same time be easily positionable in multiple positions where either normal operations can take place, or the telescoping joint is locked in a retracted position, or that the telescoping joint locks if it reaches a fully retracted position during normal operations.

These and other advantages will become apparent to those skilled in the art from a review of the preferred embodiment described below.

SUMMARY OF THE INVENTION

An automatic locking mechanism for a telescoping joint for a riser functions in several modes. In an operating mode, the joint is free to have its inner and outer barrels move with respect to each other without engaging each other in a locking relationship. In a second position, the telescoping joint locks when it is fully retracted. In a third position, the system locks the inner and outer barrels together to hold them in a fixed position. The inner and outer barrels are locked when a movable sleeve is properly positioned to allow spring-loaded dogs to be biased through windows in the sleeve so as to act as a landing shoulder to catch a groove on the outer barrel. By putting the actuating sleeve in a variety of positions, the various modes of the locking assembly can be deployed.

BRIEF DESCRIPTION OF THE DRAWINGS

FIG. 1 is a sectional elevational view with the actuating sleeve in the position where the telescoping joint will lock on full retraction, showing the position of the dogs extending through the actuating sleeve.

FIG. 2 is the view of FIG. 1, showing the outer barrel assembly displacing the dogs through the windows of the actuating sleeve.

FIG. 3 is the view of FIG. 2, showing the biased dogs falling into a groove in the connector at the end of the outer barrel assembly.

FIG. 5 is the view of FIG. 4, with the actuating sleeve shifted down to lock the dogs in position, trapping the outer barrel assembly.

FIG. 6 is the view of FIG. 1, with the actuating sleeve in an upward position, precluding the dogs from entering the window.

FIG. 7 is a section view of the locking assembly, with the dogs extending through the window.

FIG. 8 is the outside view of FIG. 7, showing the hydraulic cylinders.

FIG. 9 is a detailed view of the dogs displaced out of the window against the force of a spring.

DETAILED DESCRIPTION OF THE PREFERRED EMBODIMENT

Figure 4B:
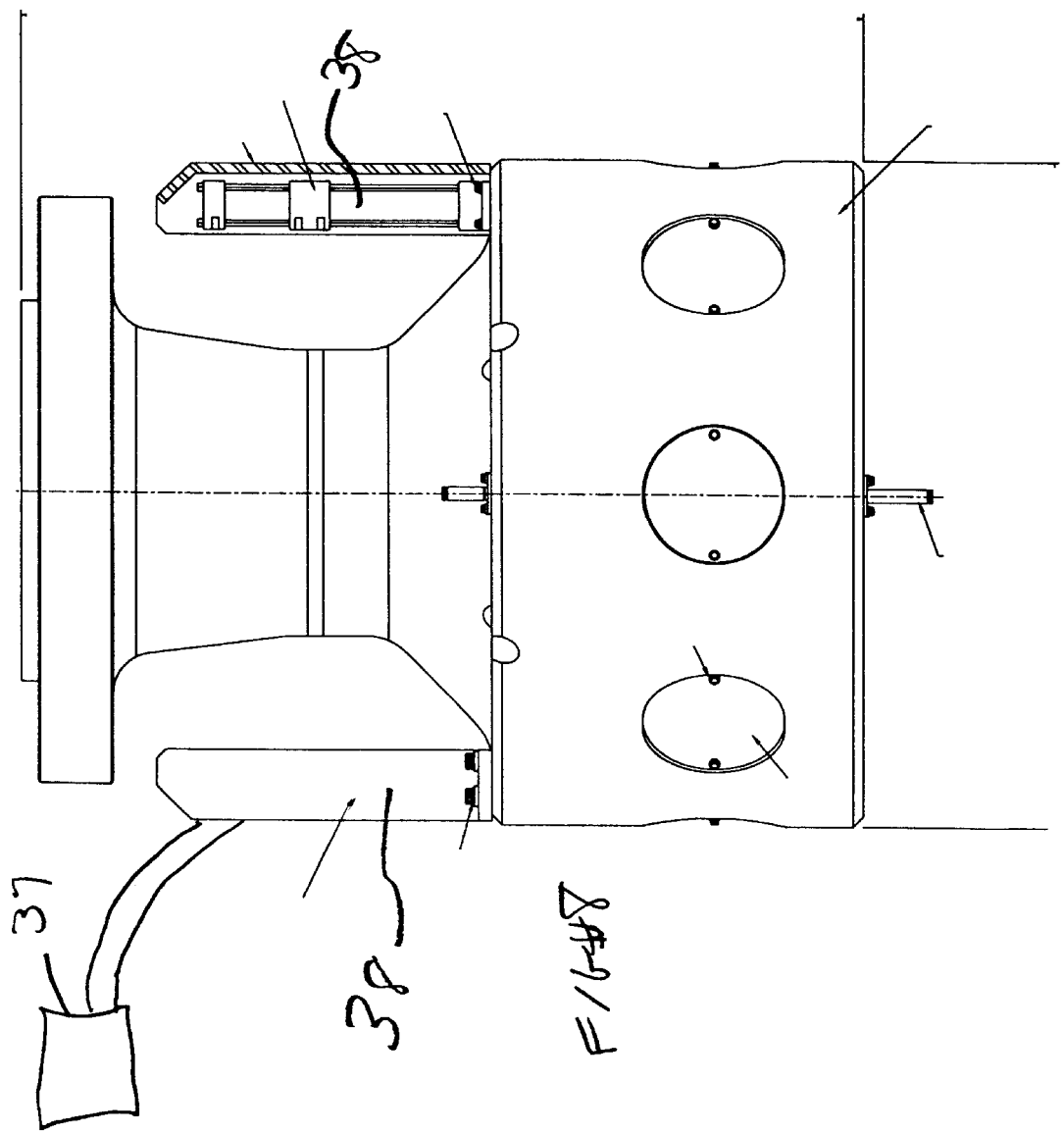
FIG. 4 is the view of FIG. 3, showing the dogs fully locked in a groove in the outer barrel assembly.

Referring to FIG. 1, a housing 10 supports the inner barrel 12 which is telescopically movable inside the outer barrel 14. The outer barrel 14 terminates in a specially designed male end connector 16. Connector 16 has a tapered camming shoulder 18 and a groove 20, which comprises of tapered surface 22, cylindrical surface 24, and radial surface 26. As shown in FIG. 4, the surfaces 22, 24, and 26 accept a dog 28, as will be described in more detail below.

The housing 10 includes an actuating sleeve 30 which has a series of windows or openings 32 around its periphery. In the preferred embodiment, the sleeve 30 has a pair of lugs 34 at 180° separation. Each of the lugs 34 is attached to a fitting 36 which accepts a shaft (not shown) extending from a hydraulic cylinder 38. The cylinders are remotely actuated by a control system panel 39 (see FIG. 8). Thus, in the preferred embodiment, a pair of hydraulic cylinders 38 is connected respectively to a fitting 36 to move opposed lugs 34 upwardly or downwardly into three different positions for the sleeve 30. The three separate positions of sleeve 30 are illustrated, respectively, in FIGS. 1, 5, and 6. The position in FIG. 1 is intermediate to the positions in FIGS. 5 and 6.

Referring again to FIG. 1 and to dogs 28, it can be seen that each of them has a loading surface 40 which, when it extends into window 32 below radial surface or shoulder 26 of end connector 16, will allow the locking connection L to remain in the fully retracted position where the inner barrel 12 is retracted to the maximum into the outer barrel 14.

The dogs 28, as seen in FIG. 9, are biased toward the position shown in FIG. 5 by a spring 42 which, coupled with the weight distribution of dogs 28, results in the weight of dogs 28 also acting to move dogs 28 about pin 44 to the FIG. 5 position. In essence, the center of gravity is to the right of pin 44, as shown in FIG. 9. Adjacent the loading surface 40 is a cylindrical surface 46 which can be engaged by the top of the window 32 of actuating sleeve 30, as shown in FIG. 5, so as to fully lock the inner barrel 12 to the outer barrel 14. Those skilled in the art will appreciate that the hydraulic cylinders 38 have been actuated to move the sleeve 30 into its most downward position with the dogs 28 extending through the windows 32 and further into groove 20 of end connector 16. When the actuating sleeve 30 is brought down to the position of FIG. 5 with the dogs 28 into groove 20 of end connector 16, the cylindrical surface 46 is locked inside the actuating sleeve 30; thus, the dogs 28 cannot be rotated about pin 44 when the sleeve 30 is in the position of FIG. 5.

FIGS. 1–4 illustrate the normal operation of the locking connection L if it is desired to have the connection L lock automatically when the inner barrel 12 is fully retracted into the outer barrel 14. The sequence begins with FIG. 1, as relative movement between the inner barrel 12 and the outer barrel 14 begins. The outer barrel moves up and/or the inner barrel moves down to lock connection L. Eventually, shoulder 18 engages surface 48 of dogs 28. Further retraction of the inner barrel 12 into the outer barrel 14 allows shoulder 18 to cam the dogs 28 about their respective pivots 44 against the force of spring 42. This movement is shown in FIG. 2, indicating that the shoulder 18 has now moved completely past dogs 28, bringing groove 20 into alignment with the spring-loaded dogs 28. Further relative movement of the inner barrel 12 into the outer barrel 14 forces the end connector 16 into contact with housing 10 at its top surface 50. In that position, the groove 20 on end connector 16 has moved somewhat past the dogs 28 such that surface 48 of dogs 28 is now resting on tapered surface 22 of groove 20. FIG. 4 now shows what happens upon further relative movement of the inner barrel 12 out of the outer barrel 14. The bias of spring 42 pulls the dogs 28 into groove 20 while being supported by the lower edge of the window 32, preventing further outward movement of inner barrel 12 with respect to outer barrel 14, as shown in FIG. 4.

As previously stated, the locked position of the inner barrel 12 to the outer barrel 14 can be secured by operation of hydraulic cylinders 38, with the components illustrated in the position of FIG. 4. Upon downwardly shifting the sleeve 30 with the dogs 28 fully inserted into groove 20, the top of window 32 engages the cylindrical surface 46, thus preventing any rotational movement of the dogs 28.

FIG. 6 illustrates the sleeve 30 placed into its upwardmost position by hydraulic cylinders 38, which brings window 32 up to the point where dogs 28, under the force of springs 42, cannot pivot sufficiently to present any portion of loading surface 40 within the sleeve 30. In the position shown in FIG. 6, during normal operations the inner barrel 12 will telescope into and out of the outer barrel 14 without ever locking to it because the dogs 28 are disabled.

Those skilled in the art can now appreciate the three different positions to meet different conditions of the locking joint L for a riser system. For transport or during storms where the riser system is disconnected from the BOP stack, it is desirable to put the locking connection L into the fully locked position shown in FIG. 5. The locking connection L is strong enough to support the BOP stack if it is disconnected from the wellhead but connected to the riser. To accomplish locking, the inner barrel 12 is telescoped fully into the outer barrel 14, with the sleeve 30 in the position shown in FIG. 1, whereupon the sleeve 30 is shifted downwardly using the hydraulic cylinders 38 so that the dogs 28 are locked into extension through the windows 32 and into the groove 20 of the end connector 16. The telescoping riser is now at its shortest length for transport or for support of the BOP stack or just the riser assembly when disconnected from the wellhead such as when storms are approaching. If operation is desired where the telescoping riser system will lock upon full retraction of the inner barrel 12 into the outer barrel 14, then the actuating sleeve 30 is placed in the middle position and FIGS. 1–4 illustrate that upon sufficient retraction of the inner barrel 12 into the outer barrel 14, the dogs 28 will jump out of the way so that groove 20 of end connector 16 can present itself opposite the windows 32. At this time, the springs 42 pull the dogs 28 downwardly to allow the conforming shapes of the dogs 28 and the groove 20 to fully engage, whereupon the load connected to the end connector 16 is fully supported off of loading surface 40 of dogs 28. This position is shown in FIG. 4.

The third position is seen in FIG. 6 where the actuating sleeve 30 is moved to its uppermost position, precluding any entrance of dogs 28 through the windows 32. This allows full telescoping action as between the inner barrel 10 and the outer barrel 14 without a locking relationship possible on full retraction of the inner barrel 12 into the outer barrel 14.

Another feature of the locking connection L is shown in FIG. 7. An indicating rod 52 connected to sleeve 30 extends through housing 10 and serves as a guide for sleeve 30 when sleeve 30 is moved up or down by hydraulic cylinders 38. The amount of extension of rod 52 out of housing 10 also gives a visual signal to operating personnel regarding the position of the sleeve 30. Those skilled in the art will appreciate that the position of the rod 52 can also be connected to a sensor which will display its position on a control panel 39 for the hydraulics which control the operation of hydraulic cylinders 38. Thus, apart from giving a visual or other type of signal as to the position of sleeve 30, the extension of rods 52 and, in the preferred embodiment there are two of them at 180°, provides a guide for the movement of sleeve 30. Also shown in FIG. 7 are fasteners 54 which are used to secure the inner barrel 12 to the locking connector L by preventing the inner barrel from becoming unthreaded.

Those skilled in the art will appreciate that the prior designs which involved manual operation in the moonpool have been dramatically improved with this design for a locking connector L for a riser system in an offshore drilling or production environment. Personnel can now select from at least three desirable modes of operation. In times of storm, for example, or during transport, the locking connector L can be placed in the position of FIG. 5 where the telescoping connection is locked into its shortest position where it can support substantial loads such as the BOP stack or just the riser assembly which may have been disconnected from the wellhead during times of storms at the surface. By using the position of FIG. 6, the locking connection L can be easily placed in a configuration where the inner and outer barrels 12 and 14 can telescope fully in both directions without locking to each other. Finally, by placing the sleeve 30 in the position shown in FIG. 1, the locking connector L will only lock the inner barrel 12 to the outer barrel 14 upon maximum retraction of the inner barrel 12 into the outer barrel 14.

The foregoing disclosure and description of the invention are illustrative and explanatory thereof, and various changes in the size, shape and materials, as well as in the details of the illustrated construction, may be made without departing from the spirit of the invention.

What is claimed:

1. A locking assembly for a telescoping riser connection, comprising:

a first tubular having a lock housing mounted thereto;

a second tubular concentrically mounted with respect to said first tubular for telescoping movement with respect to said first tubular;

said second tubular further comprising a connector selectively engageable with said lock housing;

a lock operable in said lock housing to selectively extend into contact with and secure said connector to said lock housing;

said lock further comprises a movable barrier operable from a remote location from said lock housing and a latch;

said movable barrier is selectively operable in a first mode to allow said latch to lock said first and second tubulars together automatically upon a predetermined relative movement of said concentric tubulars toward each other.

2. The assembly of claim 1, wherein:

said movable barrier is operable in a second mode so as to prevent locking of said connector to said lock housing with said latch throughout the range of telescoping movement of said concentric tubulars.

3. The assembly of claim 2, wherein:

said moveable barrier operable in a third mode to further hold said connector secured to said lock housing with said latch, beyond said first mode.

4. The assembly of claim 3, wherein said moveable barrier further comprises:

a movable sleeve mounted in said lock housing and shiftable from said remote location into three discrete positions corresponding to said three modes of said lock.

5. The assembly of claim 4, wherein:

said sleeve comprises at least one window;

said latch comprises at least one dog movably mounted to said lock housing; and a biasing device to bias said dog toward said window.

6. The assembly of claim 5, wherein:

said movable sleeve movable into a second position preventing said dog from entering said window.

7. The assembly of claim 5, wherein:

said dog comprises a loading surface;

said connector comprising a shoulder;

whereupon when said sleeve is in a first position, said dog is pushed by said connector back into said window against said biasing device and where it can be biased out under said shoulder on said connector to lock said connector to said housing on predetermined telescoping movement of said concentric tubulars.

8. The assembly of claim 7, wherein:

said dog when supporting said connector on its loading surface presents a cylindrical surface through said window;

said sleeve movable into a third position to engage said cylindrical surface on said dog to prevent its movement out of said window.

9. The assembly of claim 7, wherein:

said connector comprising a groove, a portion of which comprises said shoulder which contacts said loading surface of said dog;

said dog having a conforming cross-section to said groove when said connector is supported by said loading surface.

10. The assembly of claim 7, wherein:

said dog is pivotally mounted to said lock housing and supported by said window when its loading surface is in position to engage said shoulder on said connector.

11. The assembly of claim 10, wherein:

said connector having a top end which pushes said dog into said window and having a groove below said top end comprising said shoulder thereon;

whereupon pushing said dog through said window, said groove presents itself opposite said dog to allow said dog to be biased into said groove with said loading surface supporting said shoulder on said connector.

12. The assembly of claim 11, wherein:

said sleeve when moved into a third position prevents pivoting of said dog when said dog supports said connector.

13. The assembly of claim 4, wherein:

said sleeve movable by at least one fluid-operated mechanism.

14. The assembly of claim 13, wherein:

said sleeve further comprises an indicator rod extending through said housing to allow at least a visual indication of the position of said sleeve.

15. The assembly of claim 14, further comprising:

at least two indicating rods which also serve to guide the movement of said sleeve in said housing.

16. The assembly of claim 13, wherein:

said fluid-operated mechanism comprises opposed hydraulic cylinders.

17. The assembly of claim 1, wherein:

a control panel mounted remotely to said housing to control said movable barrier hydraulically from a remote location.

18. The assembly of claim 1, wherein:

said movable barrier operable in a mode so as to prevent locking of said connector to said lock housing throughout the range of telescoping movement of said concentric tubulars.

19. The assembly of claim 1, wherein said locking assembly further comprises:

a movable sleeve having at least one window;

a pivotally mounted dog biased toward said window;

said sleeve power actuated into a plurality of positions for either no locking engagement of said connector to said housing, or automatic engagement of said connector to said housing on a predetermined relative telescoping movement of said tubulars toward each other.

* * * * *